United States Patent [19]

Moriyama et al.

[11] 4,027,950
[45] June 7, 1977

[54] ELECTRO-OPTICAL DISPLAY DEVICE

[75] Inventors: Akio Moriyama, Katano; Masakazu Fukai, Nishinomiya; Hiroshi Tatsuta, Katano; Hiroaki Takahashi; Hiroshi Esaki, both of Moriguchi, all of Japan

[73] Assignee: Matsushita Electric Industrial Co., Ltd., Osaka, Japan

[22] Filed: Aug. 16, 1974

[21] Appl. No.: 497,935

[30] Foreign Application Priority Data

Aug. 20, 1973   Japan ............................. 48-93523

[52] U.S. Cl. ........................ 350/160 LC; 252/299
[51] Int. Cl.² ...................... C09K 3/34; G02F 1/13
[58] Field of Search .................... 252/408, 299; 350/160 LC

[56] References Cited

UNITED STATES PATENTS

| | | | |
|---|---|---|---|
| 3,795,436 | 3/1974 | Boller et al. | 252/408 LC |
| 3,796,479 | 3/1974 | Helfrich et al. | 252/408 LC |
| 3,815,972 | 6/1974 | Hsieh | 252/299 |
| 3,872,140 | 3/1975 | Klanderman et al. | 252/408 LC |
| 3,881,806 | 5/1975 | Suzuki | 252/299 |
| 3,947,375 | 3/1976 | Gray et al. | 252/299 |
| 3,960,752 | 6/1976 | Klanderman et al. | 252/299 |
| 3,983,049 | 9/1976 | Aftergut et al. | 252/299 |
| 3,988,054 | 10/1976 | Yaguchi et al. | 252/299 |
| 3,989,639 | 11/1976 | Yaguchi et al. | 252/299 |

FOREIGN PATENTS OR APPLICATIONS

| | | | |
|---|---|---|---|
| 814,291 | 8/1974 | Belgium | 252/299 |
| 2,502,904 | 7/1975 | Germany | 252/299 |
| 2,327,036 | 12/1973 | Germany | 252/299 |
| 2,024,269 | 12/1971 | Germany | 252/299 |
| 48-94694 | 12/1973 | Japan | 252/299 |
| 48-92284 | 11/1973 | Japan | 252/299 |
| 49-130882 | 12/1974 | Japan | 252/299 |
| 48-102784 | 12/1973 | Japan | 252/299 |

OTHER PUBLICATIONS

Dave, J. S. et al., Molecular Crystals, vol. 2, pp. 125–133 (1966).
Dave, J. S. et al., J. Chem. Soc., part 4, pp. 4616–4621 (1954).
Dave, J. S. et al., J. Chem. Soc., part 4, pp. 4305–4309 (1955).
Dave, J. S. et al., J. Chem. Soc., (A), pp. 1473–1478 (1967).

Primary Examiner—Benjamin R. Padgett
Assistant Examiner—T. S. Gron
Attorney, Agent, or Firm—Stevens, Davis, Miller & Mosher

[57] ABSTRACT

A non-liquid crystal organic compound having positive dielectric anisotropy is mixed with a nematic liquid crystal composition having negative dielectric anisotropy to obtain a nematic liquid crystal composition having positive dielectric anisotropy, which is used as an electro-optical element. Thus, the present invention aims at development of new use of the materials.

2 Claims, 1 Drawing Figure

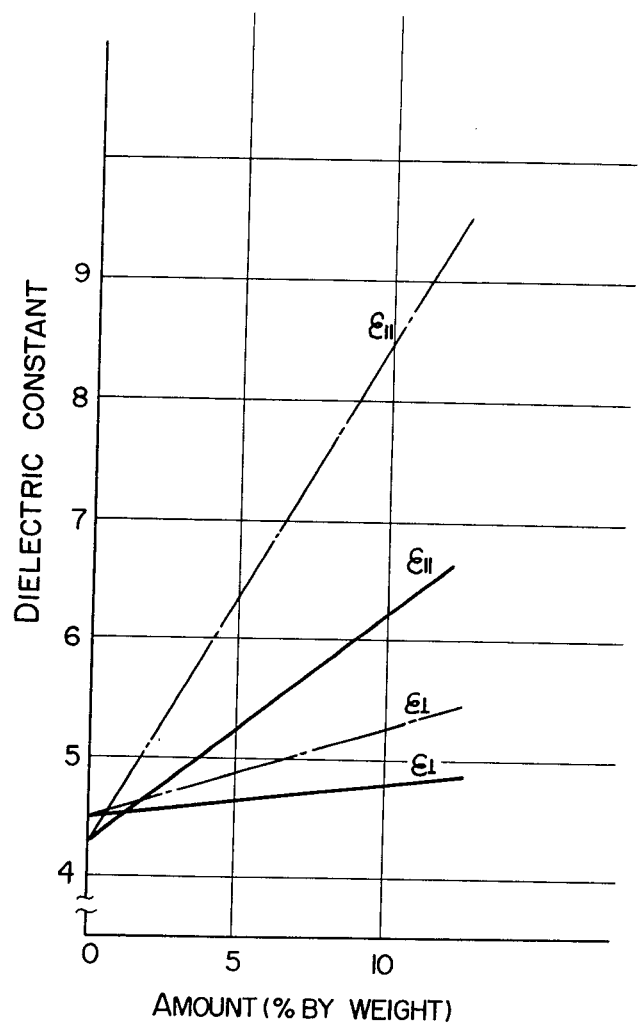

ELECTRO-OPTICAL DISPLAY DEVICE

The present invention relates to an electro-optical element employing a liquid crystal composition. More particularly, it relates to an electro-optical element employing a nematic liquid crystal composition having positive dielectric anisotropy which comprises a mixture of a nematic liquid crystal material having negative dielectric anisotropy and a non-liquid crystal organic compound having positive dielectric anisotropy.

As is well known, a nematic liquid crystal may be used for electro-optical apparatuses such as display devices, light shutters, etc.

When a nematic liquid crystal material having the relation $\epsilon_{\parallel} > \epsilon_{\perp}$ wherein $\delta_{\parallel}$ is the dielectric constant in the direction of the long axis of the liquid crystal molecule and $\delta_{\perp}$ is the dielectric constant in the direction perpendicular to said axis is placed between two electrodes and an electric field is applied to said liquid crystal, long molecular axes are aligned parallel to the direction of the applied field. Since nematic liquid molecules are optically anisotropic, the birefringence varies. As compared with optical devices utilizing "dynamic scattering effect," in the case of such device as mentioned above, a high purity liquid crystal is used and furthermore an operation voltage can be rendered lower. Thus, this device can be advantageously used for reducing the power supplying component such as battery-operation.

Practically usable nematic liquid crystals which have positive dielectric anisotropy are mainly those which have a nitrile group at the terminal of the molecule and only a few of them are available. Therefore, in the improvements in practical characteristics of the liquid crystal such as selection of compositions of a low temperature liquid crystal, time constant, operating life, etc., there have been limitations in materials.

Therefore, as a nematic liquid crystal composition having positive dielectric anisotropy in practical use, (1) nematic liquid crystal simple substances having positive dielectric anisotropy or mixtures thereof or (2) nematic liquid crystal compositions having positive dielectric anisotropy which comprise a mixture of nematic liquid crystals having positive dielectric anisotropy and nematic liquid crystals having negative dielectric anisotropy are used to obtain a stable phase of nematic liquid crystal.

In general, it has been usual that as the nematic crystal having positive dielectric anisotropy, those which have a wide mesormorphic range are chosen.

The nematic liquid crystal composition having positive dielectric anisotropy is not necessarily composed of only a liquid crystal having positive dielectric anisotropy as referred to in the above (1), but practically may be composed of a mixture with nematic liquid crystal having negative anisotropy to improve characteristics of the composition as referred to in the above (2).

On the other hand, according to the nematic liquid crystal composition of the present invention which has positive dielectric anisotropy and which is obtained by mixing a nematic liquid crystal composition having negative dielectric anisotropy with a non-liquid crystal organic compound, a stable phase can be produced as a nematic liquid crystal and by using non-liquid crystal substances as mentioned above, scope of usable materials for improvements of characteristics of the composition can be enlarged.

Similarly, an enantiotropic liquid crystal material having narrow mesomorphic range and a monotropic liquid crystal material, which are not generally used in nematic liquid crystal having positive dielectric anisotropy, may be mixed with a nematic liquid crystal composition having negative dielectric anisotropy to produce a nematic liquid crystal composition having positive dielectric anisotropy.

In the electro-optical element of the present invention, typical examples of the nematic liquid crystal materials having the negative dielectric anisotropy are p-anisylidene-p'-n-butylaniline, p-anisylidene-p'-aminophenylbutyrate, p-(p'-methoxyphenylazoxy)butylbenzene, p-(p'-ethoxyphenylazo)phenylheptanoate, p-n-hexylbenzoic acid-p'-n-hexyloxyphenyl ester, etc. Besides these compounds, many other compounds are known as such nematic liquid crystal materials.

A number of non-liquid crystal organic compounds having positive dielectric anisotropy are also found.

Especially, when halogen, nitro, nitrile, cyanomethyl, etc. which have a high electronegativity are added as a terminal group of the molecule at the position extending parallel to long axis of the molecule, the molecule has a large electric dipole moment in said direction and it can be a material having positive dielectric anisotropy.

In the case of using these compounds in admixture with a nematic liquid crystal material having negative dielectric anisotropy, it is preferred that these compounds have molecular structure similar to that of the nematic liquid crystal, have a high solubility in the nematic liquid crystal, form a stable phase in admixture with the liquid crystal and have a strong tendency of being aligned parallel to the molecule axes of the liquid crystal.

For example, compounds having the chemical formula

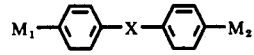

are generally suitable. In said formula, either one of said $M_1$ and $M_2$ is an atomic group having a high electronegativity such as halogens, $NO_2$, CN, $CH_2CN$, etc., the other of them is an atomic group such as hydrogen, alkyl, alkoxy, acyloxy, alkoxycarbonyl, and acyloxyalkyl, etc. and X is an atomic group such as azomethine, carboxyl, azo, azoxy, ethylene, carbonyl, ether, etc.

However, said $M_1$, $M_2$ and X are not limited to those enumerated above. Many other compounds having positive dielectric anisotropy may also be included, but those which are capable of becoming nematic liquid crystal materials are not proposed by the present invention. The compound having said formula is merely one example among those which are proposed by the present invention.

For example, the following compounds change the dielectric anisotropy of a nematic liquid crystal composition from negative to positive when they are mixed with the nematic liquid crystal composition having negative dielectric anisotropy. Below a critical concentration, said liquid crystal composition naturally has negative dielectric anisotropy. Therefore, when an electric field higher than threshold value is applied to a thin layer of the liquid crystal composition, dynamic scattering phenomenon occurs. Generally, the critical concentration is approximately 1 – 2% by weight.

Examples of these compounds are as follows:

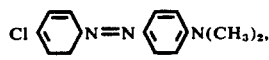

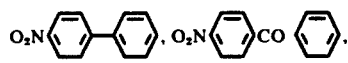

Other examples of the compounds having the formula

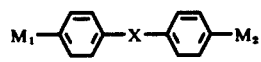

are those having the following general formulas and these compounds are also non-liquid crystals and have positive dielectric anisotropy.

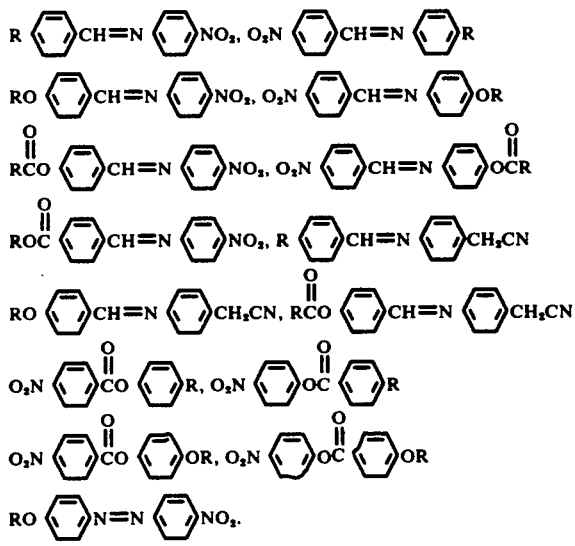

In the above general formulas, R is selected from the group consisting of hydrogen and alkyls having 1 – 8 carbon atoms.

The appended drawing is a graph which shows the relation between the dielectric constant of a liquid crystal composition and the amount of the non-liquid crystal compound mixed with a nematic liquid crystal composition having negative dielectric anisotropy.

The nematic liquid crystal composition having negative dielectric anisotropy used herein was a mixture in equal amounts of compounds (1 – 7), (3 – 5) and (2 – 4) which were compounds having the formula

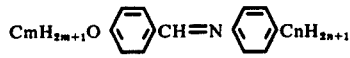

wherein $m = 1$ and $n = 7$, $m = 3$ and $n = 5$ and $m = 2$ and $n = 4$, respectively. Said mixture will be referred to as liquid crystal mixture P.

The non-liquid crystal compounds having positive dielectric anisotropy mixed with said nematic liquid crystal composition were

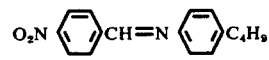          A

          B

In the drawing, the solid line and broken line show the relationship between the dielectric constant and the amount of compound A and the relation between the dielectric constant and amount of compound B, respectively. $\epsilon_\parallel$ represents the dielectric constant of the liquid crystal layer in the direction of orientation and $\epsilon_\perp$ represents dielectric constant in the direction perpendicular to the orientation.

As is clear from the drawing, addition of the non-liquid crystal compound in an amount of more than 1 – 2% by weight results in $\epsilon_\parallel > \epsilon_\perp$ and causes conversion of the liquid crystal mixture P having negative dielectric anisotropy to a nematic liquid crystal composition having positive dielectric anisotropy.

Liquid crystal composition to which said compounds A and B is added in an amount of 10% by weight has a crystal-nematic transition temperature — a nematic - isotropic liquid transition temperature of −12° C – 62° C and −15° C – 64° C, respectively. Furthermore, these liquid crystal compositions have the characteristics of higher response speed and especially shorter decay time than a composition comprising only the nematic liquid crystal material having positive dielectric anisotropy.

The electro-optical element comprising the nematic liquid crystal composition having positive dielectric anisotropy according to the present invention can be used, for example, for the following electro-optical device.

In general, such liquid crystal composition is placed between two electrode plates at least one of which is transparent. Thus, an optical device is constructed.

In order to obtain a larger change of optical characters in the device, the liquid crystal molecules in the device are placed in such an orientation that the direction of electric dipole moment is perpendicular to the direction of electric field. That is, the liquid crystal molecules are aligned with their long molecular axes parallel to the surface of the electrode. This can be attained practically, for example, by rubbing the surface of the electrode plates with a cotton fabric or an abrasive of fine grains. The long axis of the liquid crystal molecules is oriented along the direction of the rubbing.

When two electrode plates, surfaces of which are rubbed in one direction, are positioned in such a manner that the rubbing direction on the surface of the first electrode plate is perpendicular or parallel to the rubbing direction on the surface of the second electrode plate or the former is in an optional angle to the latter and the liquid crystal composition is placed between these two electrode plates, said liquid crystal layer has a homogeneous structure or a twisted structure.

When one polarizer is selectively placed on the path of light on both sides of said optical device, an electro-optical device of transmissive type is obtained, which can be utilized for display devices capable of modulating intensity of light by controlling electric field in the twisted structure or continuous color change with the intensity of electric field in the homogeneous structure. Furthermore, when a diffused reflector is placed behind said device, a reflective type device can be obtained.

When a circular polarizer is selectively placed in front of said optical device and a mirror is placed behind said device, a reflective type electro-optical device capable of modulating intensity of light by controlling electric field is obtained.

As other types of electro-optical devices, the electro-optical element of the present invention may additionally contains a pleochroic dye or a cholestric liquid crystal to obtain an electro-optical device which utilizes the characteristics of these materials. In the case of the device containing a pleochroic dye, the oriented direction of dye molecules changes cooperatively with the change of the orientation of the liquid crystal molecules by application of electric field, and results in change of color of the device due to absorption anisotropy of the dye. In the case of the device containing a cholestric liquid crystal, application of an electric field causes cholestric-nematic phase transition, which is utilized to obtain a display device in which a light contrast between milky cholesteric phase and transparent nematic phase is utilized.

As explained above, the electro-optical element of the present invention comprises a novel nematic liquid crystal composition having positive dielectric anisotropy and it has become possible to use non-liquid crystal organic compounds having positive dielectric anisotropy which have been hitherto considered valueless. Thus, the scope of the materials which can be utilized is enlarged and moreover various characteristics can be improved. It is also possible to add a mixture of non-liquid crystal materials having positive dielectric anisotropy or other additives for reducing viscosity to the electro-optical element to such a degree as not to destroy the nematic liquid crystal phase.

What is claimed is:
1. An electro-optical display device comprising
   i. two electrode plates, at least one of which is transparent,
   ii. a nematic liquid crystal composition interposed between said plates, wherein said composition has positive dielectric anisotropy and consists essentially of a nematic liquid crystal material with negative dielectric anisotropy and at least one non-liquid crystal compound selected from the group consisting of

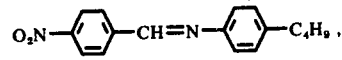

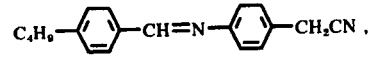

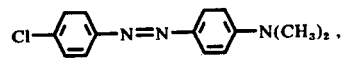

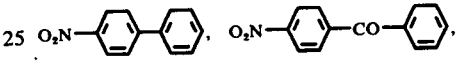

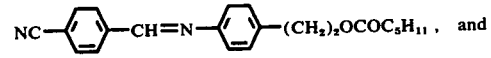

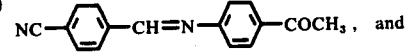

iii. means for applying an electric field across said composition.
2. The electro-optical display device according to claim 1, wherein said non-liquid crystal compound is selected from the group consisting of

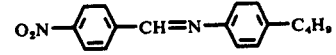

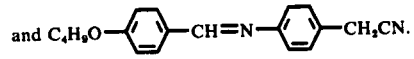

* * * * *